(12) United States Patent
Pattison et al.

(10) Patent No.: US 10,496,107 B2
(45) Date of Patent: Dec. 3, 2019

(54) AUTONOMOUS SECURITY DRONE SYSTEM AND METHOD

(71) Applicant: Valeo North America, Inc., Seymour, IN (US)

(72) Inventors: Mark Anthony Pattison, Farmington Hills, MI (US); Gavin Francis Warner, Columbus, IN (US); John Steven Orisich, Columbus, IN (US)

(73) Assignee: Valeo North America, Inc., Seymour, IN (US)

( * ) Notice: Subject to any disclaimer, the term of this patent is extended or adjusted under 35 U.S.C. 154(b) by 332 days.

(21) Appl. No.: 15/407,650

(22) Filed: Jan. 17, 2017

(65) Prior Publication Data

US 2018/0203470 A1    Jul. 19, 2018

(51) Int. Cl.
| | |
|---|---|
| *G05D 1/12* | (2006.01) |
| *G05D 1/10* | (2006.01) |
| *G05D 1/00* | (2006.01) |
| *G08G 5/00* | (2006.01) |
| *B64C 39/02* | (2006.01) |
| *B64D 47/04* | (2006.01) |
| *B64D 47/08* | (2006.01) |
| *H04W 4/00* | (2018.01) |
| *H04W 4/02* | (2018.01) |
| *G05D 1/02* | (2006.01) |

(Continued)

(52) U.S. Cl.
CPC ............. *G05D 1/12* (2013.01); *B64C 39/024* (2013.01); *B64D 47/04* (2013.01); *B64D 47/08* (2013.01); *G05D 1/0016* (2013.01); *G05D 1/0094* (2013.01); *G05D 1/102* (2013.01); *G08G 5/006* (2013.01); *G08G 5/0013* (2013.01); *G08G 5/0069* (2013.01); *H04W 4/00* (2013.01); *H04W 4/02* (2013.01); *B60Q 2400/40* (2013.01); *B64C 2201/12* (2013.01); *B64C 2201/127* (2013.01); *B64C 2201/141* (2013.01); *B64C 2201/208* (2013.01); *G05D 1/0202* (2013.01); *H04W 4/021* (2013.01); *H04W 4/40* (2018.02); *H04W 4/90* (2018.02)

(58) Field of Classification Search
CPC ...... G05D 1/12; G05D 1/0016; G05D 1/0094; G05D 1/0202; G05D 1/102; H04W 4/40; H04W 4/90; H04W 4/021; H04W 4/02; H04W 4/00; B60Q 1/00; G08G 5/0013; G08G 5/006; G08G 5/0069; B64D 47/04; B64D 47/08; B64C 39/024; B64C 2201/127; B64C 2201/141; B64C 2201/208

See application file for complete search history.

(56) References Cited

U.S. PATENT DOCUMENTS

| | | | |
|---|---|---|---|
| 7,755,496 B1 * | 7/2010 | Bernstein | ........... B63C 9/00 340/573.1 |
| 9,373,262 B2 | 6/2016 | Stigler et al. | |

(Continued)

*Primary Examiner* — Assres H Woldemaryam
(74) *Attorney, Agent, or Firm* — Oblon, McClelland, Maier & Neustadt, L.L.P.

(57) ABSTRACT

A drone aircraft for personal assistance or protection. When a driver's car is located in a parking lot at night, the driver can summon a drone stored in the vehicle which flies to the driver and leads the driver to the vehicle by projecting a spot of light onto the ground. The drone makes a video recording of events occurring at this time and transmits the recording to a remote storage location.

20 Claims, 14 Drawing Sheets

(51) Int. Cl.
*H04W 4/021* (2018.01)
*H04W 4/90* (2018.01)
*H04W 4/40* (2018.01)

(56) References Cited

U.S. PATENT DOCUMENTS

| | | | |
|---|---|---|---|
| 9,409,644 | B2 | 8/2016 | Stanek et al. |
| 9,594,372 | B1 * | 3/2017 | Sills .................... G05D 1/0011 |
| 2014/0061478 | A1 * | 3/2014 | Hiebl ...................... F41H 13/00 250/342 |
| 2015/0035437 | A1 | 2/2015 | Panopoulos et al. |
| 2015/0298786 | A1 | 10/2015 | Stigler et al. |
| 2016/0016663 | A1 | 1/2016 | Stanek et al. |
| 2016/0185466 | A1 * | 6/2016 | Dreano, Jr. ........ G06Q 30/0635 705/26.81 |
| 2016/0214713 | A1 * | 7/2016 | Cragg ................... B64C 39/024 |
| 2016/0313742 | A1 * | 10/2016 | Wang .................. G05D 1/0669 |
| 2016/0327950 | A1 * | 11/2016 | Bachrach ............. G05D 1/0016 |
| 2016/0344981 | A1 * | 11/2016 | Lunt ......................... G01C 3/08 |
| 2017/0129603 | A1 * | 5/2017 | Raptopoulos ......... B64C 39/024 |
| 2017/0249846 | A1 * | 8/2017 | Ignaczak ............... B64C 39/024 |
| 2018/0075759 | A1 * | 3/2018 | Kim .................... G08G 5/0069 |
| 2018/0095469 | A1 * | 4/2018 | Leurent ................ G05D 1/0094 |
| 2018/0143636 | A1 * | 5/2018 | Pinto .................... B64C 39/024 |
| 2018/0290750 | A1 * | 10/2018 | Pfoertzsch ........... G05D 1/0094 |

\* cited by examiner

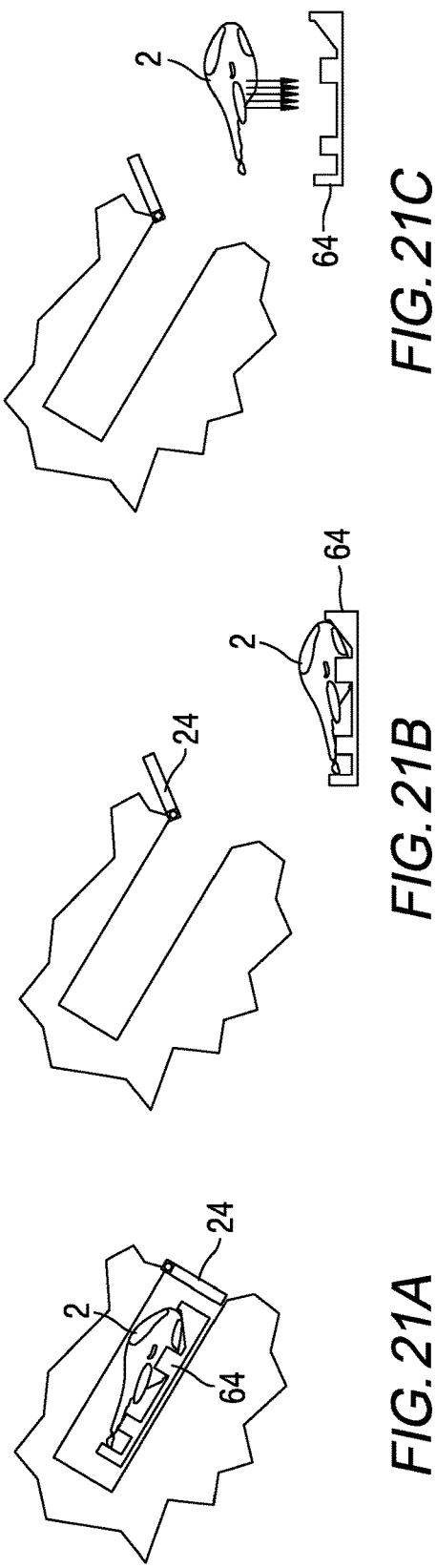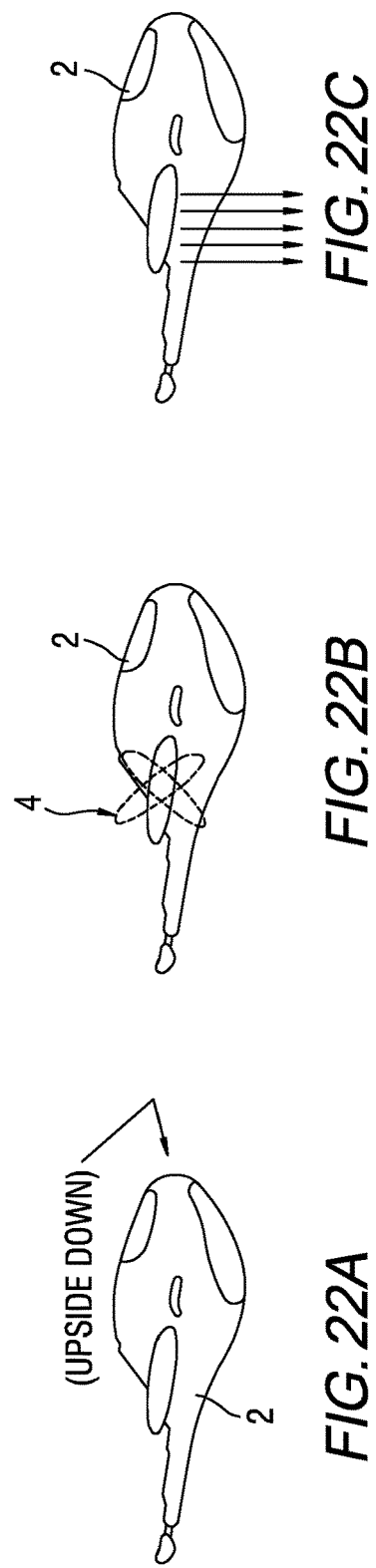

FRONT VIEW

AUTONOMOUS SECURITY DRONE SYSTEM AND METHOD

BACKGROUND OF THE INVENTION

1. Field of the Invention

This invention relates to vehicles and, more particularly, to the use of an autonomous security drone with a vehicle for improved security, surveillance, navigation and guidance.

2. Description of the Related Art

In recent years, unmanned aerial vehicles (UAVs), commonly known as drones, is an aircraft without a human pilot aboard. In recent years, miniature drones have been developed and sold for use by consumers and without being related to the military. The drones typically take the form of a copter having a plurality of copter blades, but they can also take the form of a conventional lightweight miniature airplane.

Some of the miniature or micro drones have a plurality of rotors and gyroscopic controls so that consumers can fly the miniature or micro drones safely inside or outside a dwelling.

Some of the consumer miniature or micro drones are quite sophisticated and can have such features as conventional crash avoidance systems, ultrasonic altitude sensors, GPS control, cameras, lights, GeoFencing and the like.

Vehicle safety and security has been addressed for some time. For example, many vehicles have an alarm system which sounds an audible alarm when an unauthorized attempt is made to unlock or enter the vehicle.

The inventor has found a significant way to improve the security of a vehicle and the safety of persons who operate or are passengers in the vehicle by utilizing an improved drone system and method with the vehicle and the manner as described herein.

SUMMARY OF THE INVENTION

It is, therefore, an object of the invention to improve the security and safety of a vehicle operator or passenger utilizing an autonomous drone system and method as provided herein.

Another object of the invention is to provide a drone that is stored on a vehicle and capable of being deployed from the vehicle in response to being summoned by a user.

Still another object of the invention is to permit a user to summon a drone to be deployed from a vehicle using a remote activation unit, portable phone, personal digital assistant (PDA), key fob or other portable summoning device.

Yet another object of the invention is to provide a drone that can be deployed from a vehicle to a user wherein the drone can be used to light a pathway for the user.

Another object of the invention is to provide a vehicle and drone system wherein the drone may comprise at least one or a plurality of cameras and/or light sources not only for illuminating a pathway, but for recording images of the user and/or the area around the user as the user approaches or leaves the vehicle.

Another object of the invention is to provide at least one or a plurality of light sources that are capable of providing pathway illumination as well as signalling illumination.

Another object is to provide a vehicle and drone security system that enables security video footage to be taken as a user returns to or departs from the vehicle.

Yet another object of the invention is to provide a drone unit that can be stored on the vehicle.

Still another object is to provide a vehicle having a drone unit that permits video and audio recordings to be uploaded in real time to a secure site or server via a user's cellular phone or from the drone itself.

Yet another object is to provide a vehicle and autonomous drone that will have internet access to facilitate GeoFencing.

Another object of the invention is to provide a vehicle and drone unit that is adapted to provide specific directional lighting and sound, alarms or alerts when objects are found moving toward an individual, such as a driver of the vehicle.

Another object is to provide a vehicle and drone system that is adapted to have point-to-point navigation and object avoidance navigation facilitated to safely guide a user along a desired path or even away from a dangerous object or situation.

In one aspect, one embodiment comprises an apparatus for assisting a driver who is located remote from a vehicle, the apparatus comprising at least one light source, and an aircraft or drone located remote from the driver, the aircraft or drone being adapted to fly towards the driver in response to a summons issued by a communication device and energize the at least one light source to illuminate an area near the driver.

In another aspect, another embodiment comprises a system for assisting a driver of a motor vehicle, comprising an aircraft or drone comprising a propulsion system for maintaining the aircraft or drone airborne, a receiver for receiving at least one location signal indicating a location of a driver, at least one light source, a control system for directing the at least one light source toward either the driver or a vicinity of the driver, and a navigation system which enables the aircraft or drone to fly autonomously from a storage location toward the driver in response to a summons from a transmitter under control of the driver.

In yet another aspect, another embodiment comprises an apparatus for assisting a person located at a first location, the apparatus comprising an aircraft or drone which flies toward the person in response to a summons from a transmitter operated by the person, the aircraft or drone comprising at least one light source that is energized to illuminate an area associated with the person.

This invention, including all embodiments shown and described herein, could be used alone or together and/or in combination with one or more of the features covered by one or more of the following list of features:

- The apparatus in which the aircraft or drone comprises at least one of the following a navigation system which deduces current latitude and longitude of the aircraft or drone, receives a destination, indicated by a latitude and a longitude, from the communication device, and pilots the aircraft or drone toward the destination, one or more movable spotlights which can illuminate terrestrial regions, at least one of a still camera or a video camera which can capture images of terrestrial regions, a transmitter for transmitting the images to a remote storage location, or a detector for detecting moving terrestrial entities.
- The apparatus in which the aircraft or drone comprises a camera, the at least one light source being adapted to provide a spotlight that provides illumination which assists the camera in capturing images.
- The apparatus in which the at least one light source comprises a first spotlight that illuminates a first area and a second spotlight that illuminates a second area.
- The apparatus in which the aircraft or drone detects a moving object or person and the second spot is directed at or near the object or person.

The apparatus in which, prior to receipt of the summons, the aircraft or drone is stowed in the vehicle.

The apparatus in which, prior to receipt of the summons, the aircraft or drone is located on or in a stationary building or structure outside the vehicle.

The apparatus in which the vehicle transmits its coordinates to the aircraft or drone; and the aircraft or drone guides the driver toward the vehicle based on the coordinates.

The apparatus in which the aircraft or drone flies the driver and guides the driver toward the vehicle by energizing the at least one light source lighting a path for the driver.

The apparatus in which the communication device transmits at least one of a set of coordinates of the driver or a deployment signal to the aircraft or drone.

The apparatus in which the communication device transmits both of a set of coordinates of the driver and a deployment signal to the aircraft or drone.

The system wherein the communication device is at least one of a smart phone application, a Personal Digital Assistant (PDA), a key fob or a standard joystick-type remote control.

The apparatus in which the aircraft or drone further with a navigation system which deduces current latitude and longitude of the aircraft or drone, receives a destination, indicated by a latitude and a longitude, from the communication device, and pilots the aircraft or drone toward the destination, one or more movable spotlights which can illuminate terrestrial regions; and at least one of a still camera or a video camera which can capture images of terrestrial regions.

The system wherein at least one signal comprises a drone release or deployment signal and a driver location or coordinate signal.

The system wherein the system further comprises a camera.

The system in which the vehicle comprises a storage area or bay for storing the aircraft or drone, the storage area or bay releases the aircraft or drone in response to a release or deployment signal from the transmitter.

The system in which the at least one signal indicates a latitude and a longitude of the driver.

The system wherein the transmitter is at least one of a smart phone application, a Personal Digital Assistant (PDA), a key fob or a standard joystick-type remote control.

The system wherein the at least one light source lights a pathway to the vehicle for the driver.

The apparatus in which the aircraft or drone is situated at a second location remote from the first location.

The apparatus in which the aircraft or drone energizes the at least one light source to project a spot of light onto the ground along a pathway or route which leads to a location to which the person desires to travel.

The apparatus in which the aircraft or drone transmits a visual or audio signal which acknowledges receipt of the summons.

The apparatus in which the aircraft or drone comprises a camera and storage that creates a video record of events occurring during its flight.

The apparatus in which the aircraft or drone transmits the video record to a remote location.

These and other objects and advantages of the invention will be apparent from the following description, the accompanying drawings and the appended claims.

BRIEF DESCRIPTION OF THE ACCOMPANYING DRAWINGS

FIGS. 20, 21A, 21B, 21C and 22 illustrate approaches to launching the drone;

DETAILED DESCRIPTION OF THE PREFERRED EMBODIMENTS

Figure 1:
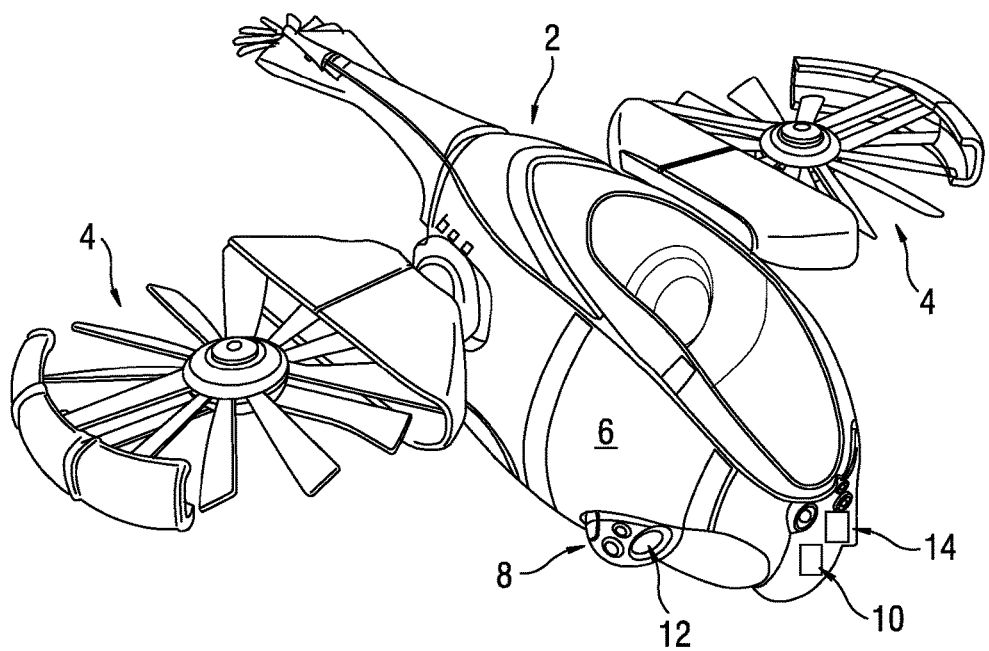
FIG. 1 illustrates a small aircraft or drone.

In FIG. 1, a drone 2 contains rotors 4 that provide both lift and propulsion and a hull 6 which may provide some lift during flight. The drone 2 is equipped with a primary light source 8 that generates a primary light beam 26 and one or more secondary light sources 10 that generates one or more secondary light beams. Each of the primary light source 8 and secondary light sources 10 has its own respective gimballed mounts, such as mount 12, which allows each of the primary and secondary light sources 8 and 10 to project light in a desired direction (up, down, left, and right) independent of the orientation of the drone 2 itself. In general, the system and method described herein provide the drone 2 for use in combination with a vehicle 20 in the manner described herein.

The drone 2 is also equipped with a primary camera 14, which is supported by the same type of gimballed mount as the primary light source 8. Because the primary light source 8 is gimballed, it can direct its illumination toward a subject (such as a user or operator 16 of a vehicle) and the primary camera 14 may substantially simultaneously capture an image the same subject. As described later herein, the subject may be an area, a person, an object or other item.

In another form of the invention, both the primary camera 14 and the primary light source 8 are mounted on the same gimballed mount so that the primary light source 8 continually provides illumination for the field of view of the primary camera 14.

In one form of the invention, the primary camera 14 is equipped with a subject matter holding function, as known in the art, which allows the camera 14 to automatically track a subject within its field of view. That is, in the absence of a holding function, the subject could possibly leave the field of view of the primary camera 14 as the drone 2 and the subject move with respect to each other. The subject matter holding function keeps the subject within the field of view of the camera 14 to allow the camera 14 to continue to image the subject as relative movement occurs.

The drone 2 is also equipped with at least one or a plurality of sensors 30 (FIG. 25) that detect nearby objects, as will be described more fully later.

Figure 4:
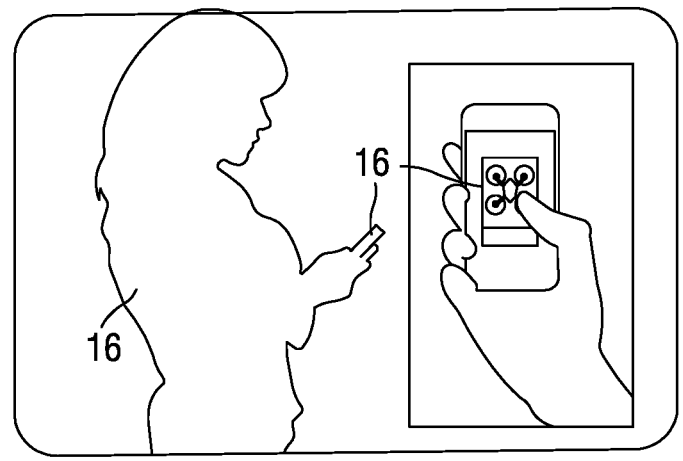

The drone 2 comprises a remote activation unit 18 for remotely actuating and controlling the drone 2. In one embodiment, the remote activation unit 18 in FIG. 4 is carried by a human operator or user 16 of the drone 2. In another embodiment, the remote activation unit 18 can be incorporated into a smart phone application, a Personal Digital Assistant (PDA), a key fob, a standard joystick-type remote control used by model airplane enthusiasts or another suitable portable device. The remote activation unit 18 comprises a control application for controlling the drone 2. In one embodiment, the application comprises deployment, control and docking or return-to-vehicle routines.

As explained later, after activation by the remote activation unit 18, the drone 2 is energized and flies autonomously to perform its functions. However, in one form of the invention, the autonomous operation can be terminated and the drone 2 can be immediately and directly controlled by the remote activation unit 18 in the usual manner of controlling model aircraft or drone 2.

Figure 2:
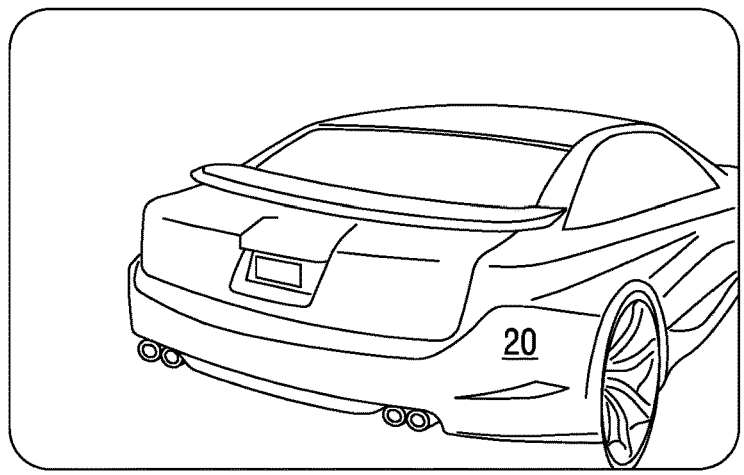
FIGS. 2-16 illustrate a sequence of operations undertaken by one form of the invention.
Figure 3:
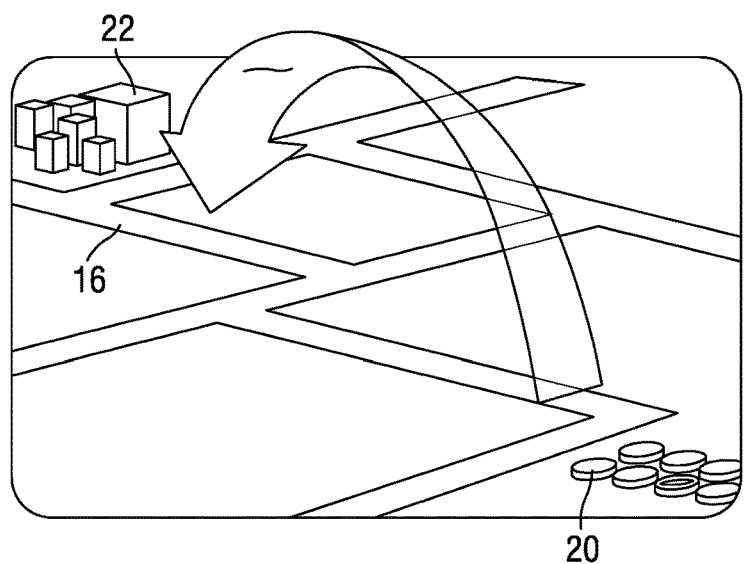

FIGS. 2-16 illustrate a sequence of events which demonstrate selected features of the invention. In FIG. 2, the user's vehicle 20 is located, for example, in a parking lot at night. FIG. 3 shows the user 16 located some distance from the vehicle 20 and approaching the vehicle 20. A building 22 is located in the background in the example in FIG. 3.

Figure 5:
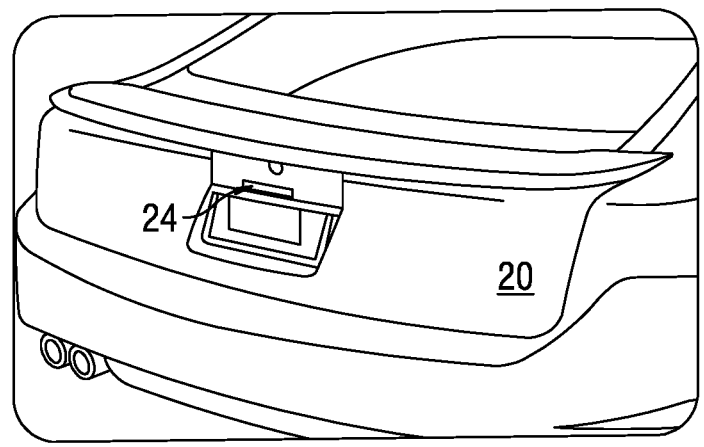
Figure 6:
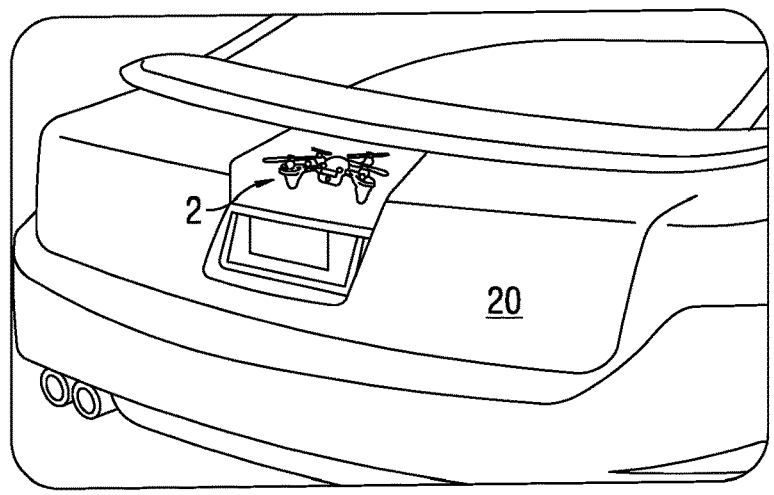
Figure 7:
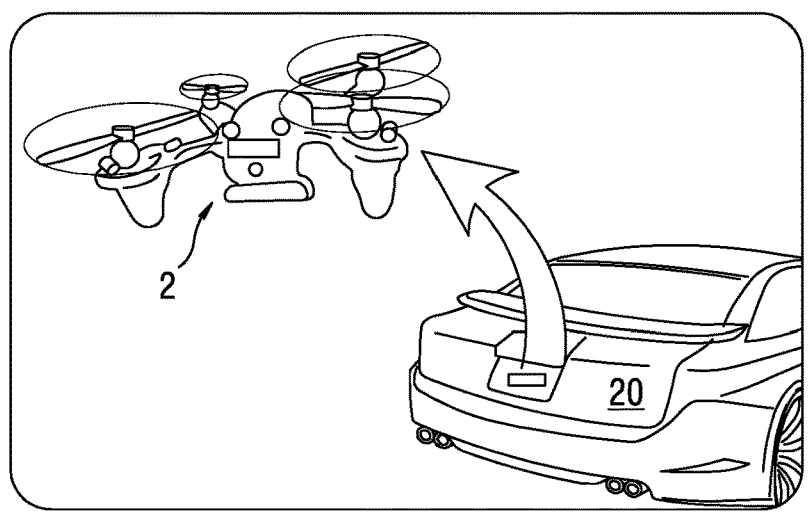
Figure 18:
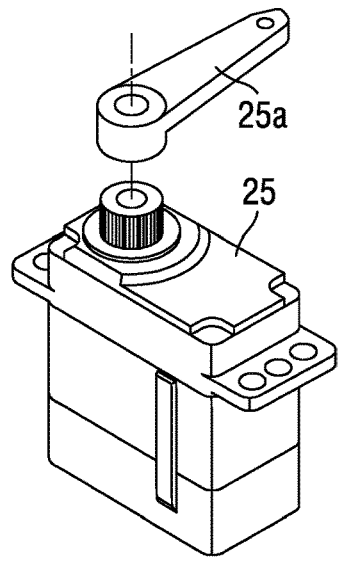
FIG. 18 illustrates a servo-mechanism used by the invention.

In FIG. 4, the user 16 uses the application contained in the portable remote activation unit 18 to summon the drone 2 of FIG. 1. In FIGS. 5 and 6, a servo mechanism 25 (FIG. 18) mounted on the vehicle 20 activates an arm 25a that opens a door or hatch 24 in the vehicle 20 that allows the drone 2 to exit the vehicle 20 and become airborne as in FIG. 7. Once deployed, the primary light source 8 on the drone 2 projects the primary light beam 26 (FIG. 8), which acts as a signal indicating to the user 16 (FIG. 9) that the drone 2 has responded to the summons.

In one illustrative embodiment, the drone 2 is stored in a compartment or bay of the vehicle 20, such as a trunk. However, it could be stored in other areas of the vehicle 20, such as under a fender, an engine compartment or a storage container mounted on the vehicle 20. The separate storage container (not shown) can be used to store the drone 2, and the container could be detachably mounted to the vehicle 20.

Figure 8:
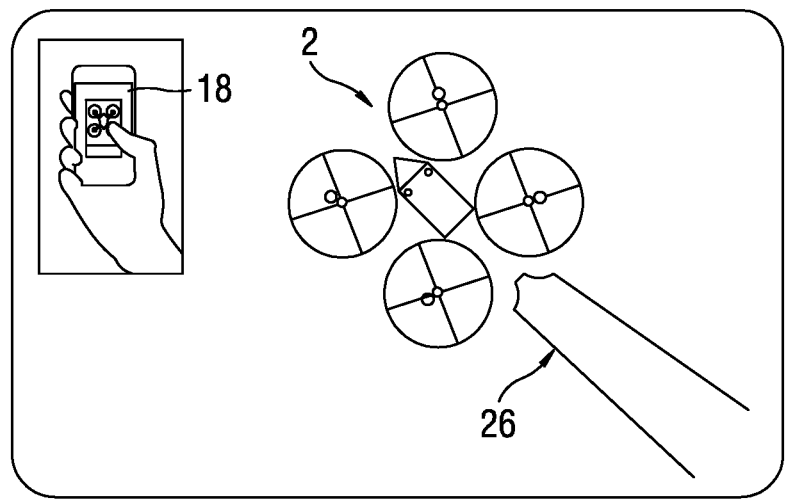

FIG. 8 shows the primary light beam 26 being directed toward the ground. However, the drone 2 retains in its memory the location of the user 16 from the portable remote activation unit 18, the primary light beam 26 may be directed toward the user 16 instead of toward the ground. This approach may be desirable for security considerations in some cases. The remote activation unit 18 displays an estimated time of arrival of the drone 2 to the user 16, so the user 16 is aware of its arrival time.

Figure 9:
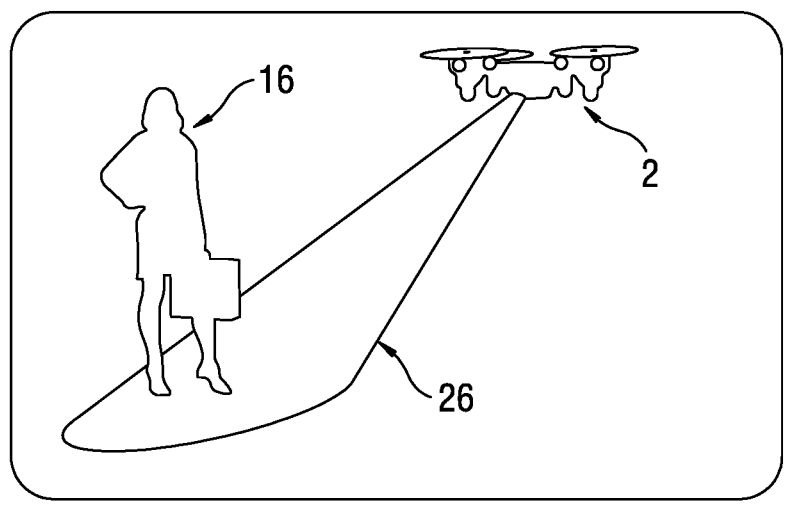
Figure 10:
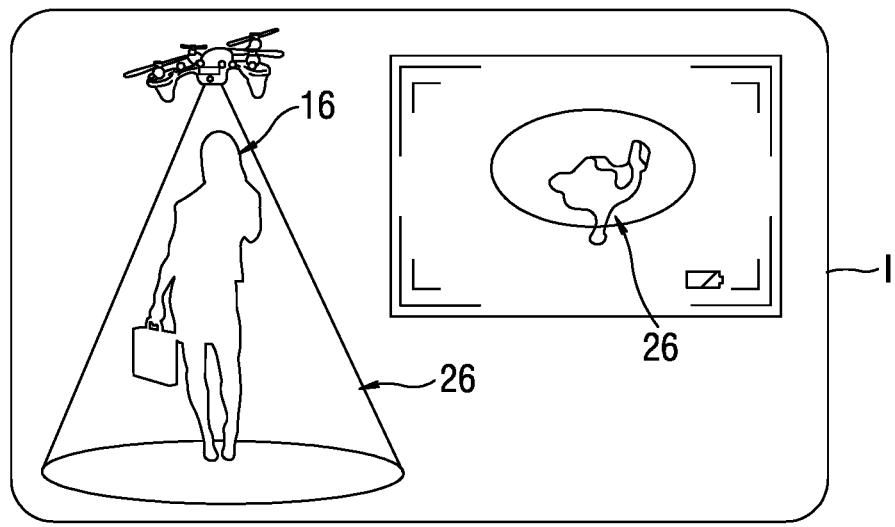
Figure 11:
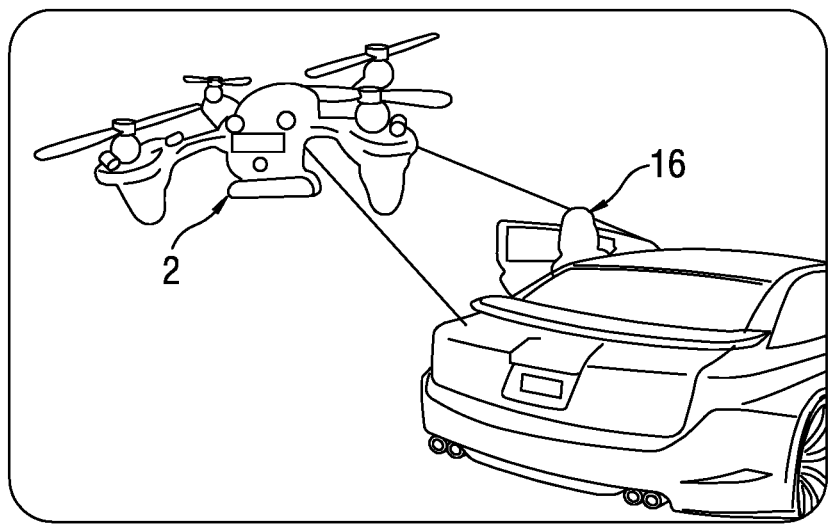

In FIGS. 9-11, the drone 2 has flown toward and reached the user 16 and then the vehicle 20 of FIG. 1, while continually projecting the primary light beam 26 ahead of or even on the user 16 to illuminate a path for the user 16 toward the vehicle 20. In one embodiment, the primary light beam 26 can be in the range of 10,000 lumens or greater. In one embodiment, one or both of the primary or secondary light sources 8, 10 may generate a signaling light beam 27. This latter light beam is different from the primary lighting beam 26 in that the latter beam is directed toward the ground. Also, the signaling light beam 27 may be of lesser intensity or color (e.g., amber), such as twenty percent of the intensity of the illuminating-guiding light beam.

In this example, the flight of the drone 2 originated at the vehicle 20 and the drone 2 retains in its memory the coordinates of the vehicle 20, so that the drone 2 can later locate the vehicle 20 in order to return thereto. During this return time, the drone 2 uses the primary camera 14 of FIG. 1 to record the excursion of the user 16 along the path. For some purposes, the drone 2 can also record events on the ground during its outward flight to the user 16. This recording is stored locally in the drone 2 and is also transmitted to a remote location to create an archival copy. The insert I in FIG. 10 illustrates one of the views taken by the camera 14 during recording and displayed on the remote activation unit 18 held by the user 16.

The drone 2 can issue an audible signal, such as by the audible phrase "BEEP BEEP" in FIGS. 10 and 11, which can assist the user 16 in locating the drone 2 in darkness. The drone 2 comprises a speaker 28 in FIG. 25 that issues this audio signal.

The drone 2 can be equipped with the sensors 30 which detect whether an object is moving toward the user 16, the vehicle 20, or both. This detection can be done optically through frame-by-frame image comparison using the camera 14. The optical detection can employ infra-red photography, which will detect the heat signature of humans and animals and also heat generated by combustion engines or electric motors. The latter type of detection can be significant if a motorized vehicle is approaching.

In addition, certain filters in optical photography will highlight vegetation, so that an object, such as a human, animal, or robot, traveling over the vegetation will eclipse the vegetation and exhibit a characteristic moving image in the form of the eclipse. The detection can be performed acoustically, as where a Doppler shift will be generated by a moving entity and detected by the drone 2. In this example, the moving entity disrupts a standing wave pattern established by the drone 2 or the material of which an object is constructed reflects sound in a characteristic manner compared with the surroundings, as in sonar used by navies.

Another solution to motion detection is radar, analogous to the radar used to measure a pitch speed of a baseball.

Figure 17B:
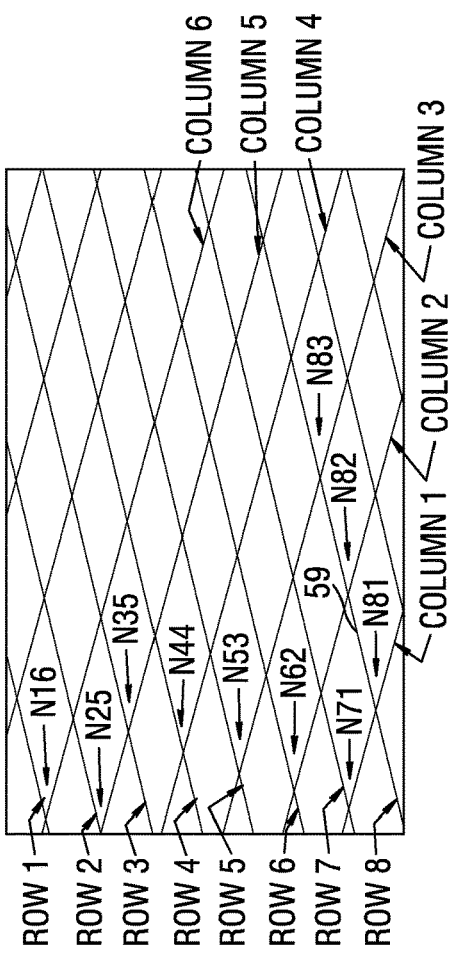
FIG. 17B shows a network which, in FIG. 17C is superimposed on FIG. 17A in order to deduce route in FIG. 17D.
Figure 17D:
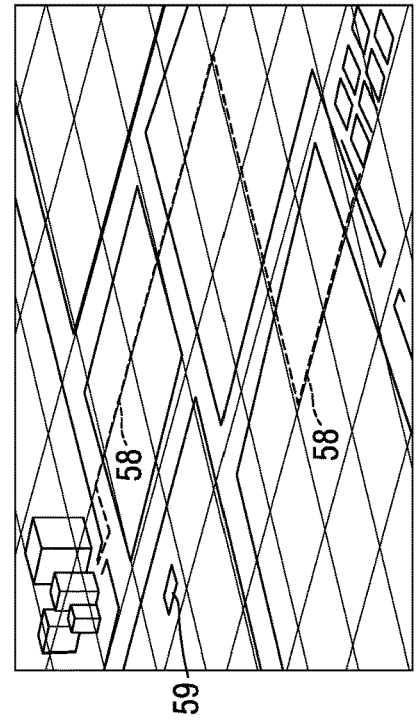
FIG. 17A illustrates an overhead view taken by the drone.
Figure 17A:
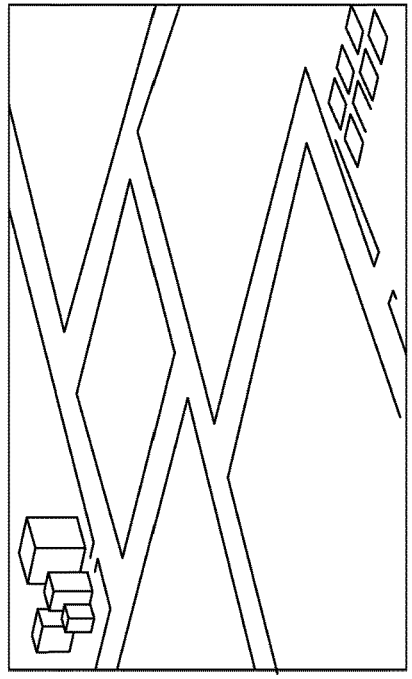
Figure 17C:
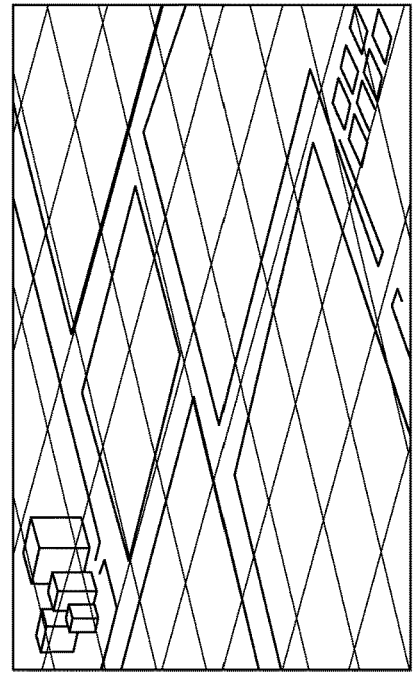

In response to being summoned by the user and/or detection of moving objects by the drone 2, the drone 2 will determine and suggest a path to the vehicle 20 to be taken by the user 16 utilizing conventional network theory, thereby allowing path identification. For example, FIG. 17A shows an aerial view taken by the camera 14 within the drone 2. FIG. 17B shows a conceptual network or grid generated by a controller or computer 32 (FIG. 25) located on the drone 2. The computer 32 generates a grid comprising nodes N which are labeled according to a Cartesian grid. For example, the label N81 means that the node is located at the intersection of row 8 and column 1. FIG. 17C shows the network of FIG. 17B superimposed onto the aerial view of FIG. 17A. If an object 34 to be avoided is detected, then the drone 2 can compute an alternate route 36 and guide the user 16 away from the object.

This can be done, for example, by first computing the distance between every path and the object 34. The path is the line between adjacent nodes, such as path 38, which lies between nodes N81 and N82. Next, a route, which is a collection of contiguous paths in which no path is closer to the object 34 than a prescribed limit is found. Route 36 in FIG. 17D is an example. This limit keeps the user 16 from approaching closer to the object 34 than that prescribed limit.

The network of FIG. 17B can be constructed in terms of latitude and longitude coordinates and obtained from a Global Positioning System or GPS. For example, node N81 has one pair of coordinates and node N82 has another pair. In this manner, identification of the route 36 directly indicates a sequence of geographic coordinates which the drone 2 is to fly, with no significant additional computation required. That is, the network of FIG. 17B, which is used to deduce the route 36 need not be constructed in realistic dimensions can be a scale model as it were. If so, the scale model would then require a translation into actual dimensions in order to deduce a flight plan for the drone 2. In contrast, in another embodiment, the network of FIG. 17B may be constructed using actual geographic coordinates for the nodes in which case no translation is required, thereby saving computer time.

In one embodiment, the primary light source 8 generates the uninterrupted primary light beam 26, but the drone 2 may also illuminate the route 36 by periodic flashes of light that progressively indicate points on the path for the user 16. In that embodiment, the user 16 would see a spot of light periodically sweep along route 36 in FIG. 17D. Alternately, the drone 2 can illuminate a nearby spot on the route 36 and then when the user 16 approaches that nearby spot, illuminate the next spot, and so on.

Figure 12:
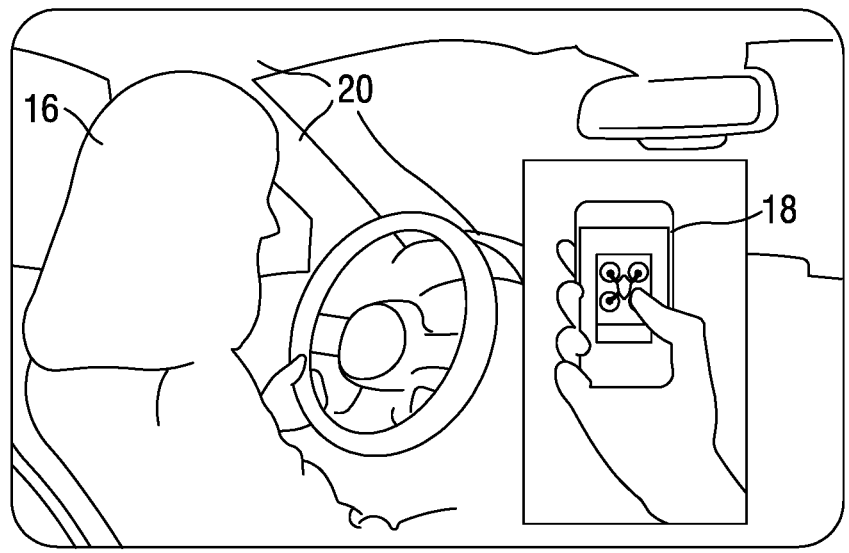
Figure 13:
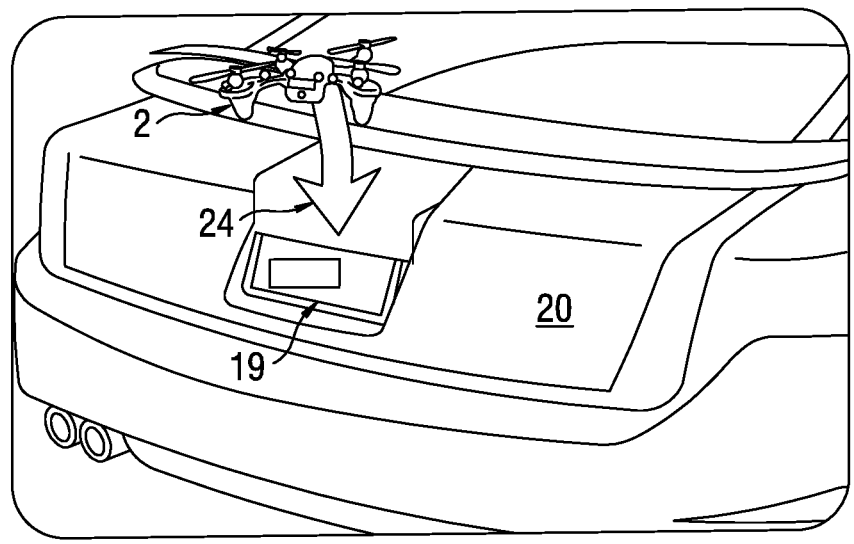

In FIG. 12, the user 16 has entered the vehicle 20, while the drone 2 re-enters its storage bay or area 19 in FIG. 13 on the vehicle 20.

Figure 14:
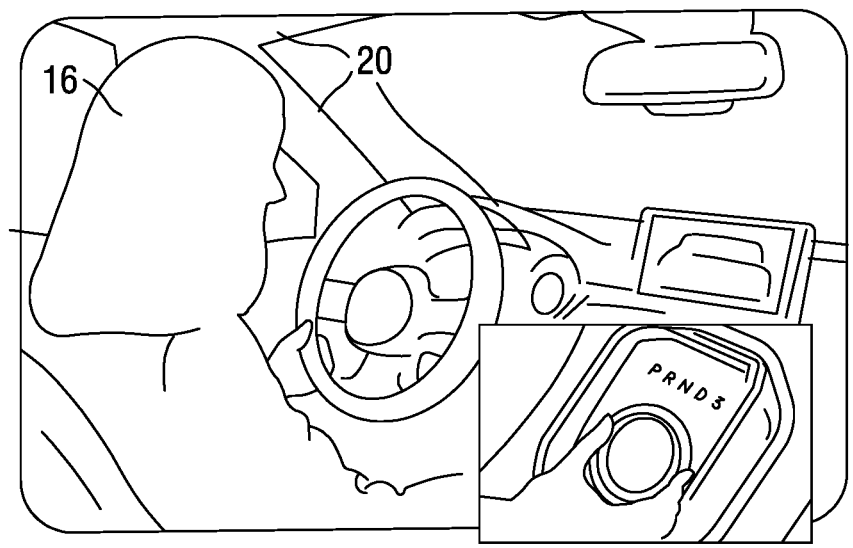
Figure 15:
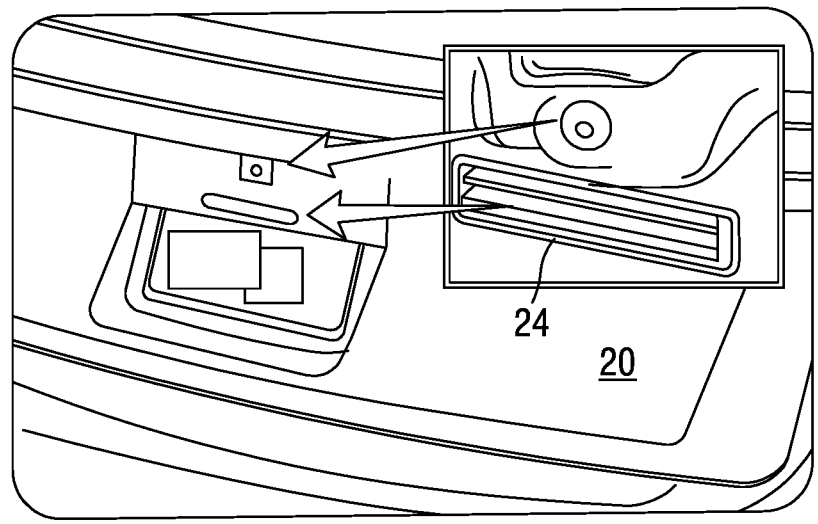
Figure 16:
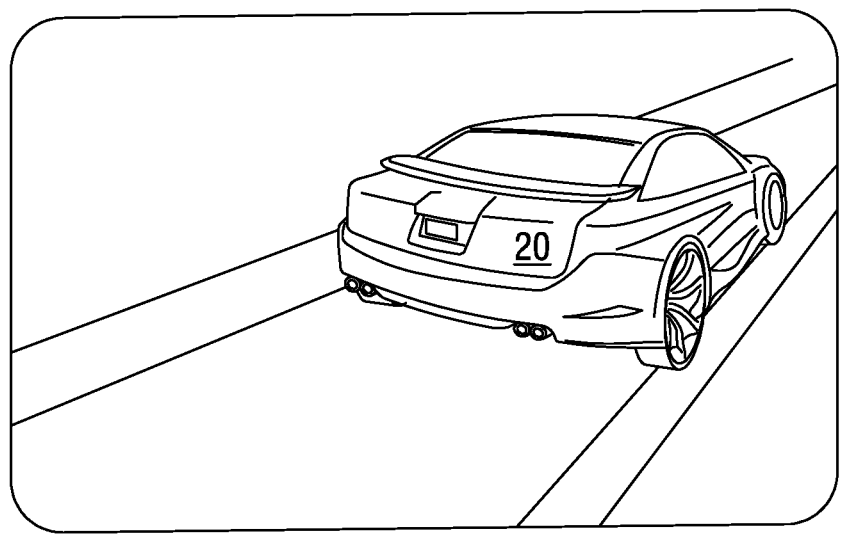

In FIGS. 14-16, the user 16 places the transmission of the vehicle 20 in reverse gear and the drone 2 projects its primary light source 8 to act as reverse lighting for the vehicle 20. At this time, the drone 2 may continue its video recording and remote transmission, especially if a hazard or danger is considered present. In FIG. 16, the user 16 safely drives away.

Figure 19:
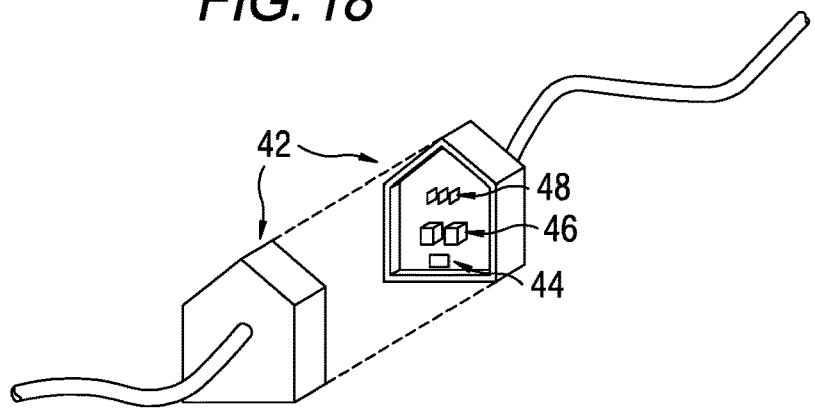
FIG. 19 illustrates a quick-disconnect electrical connector.
Figure 25:
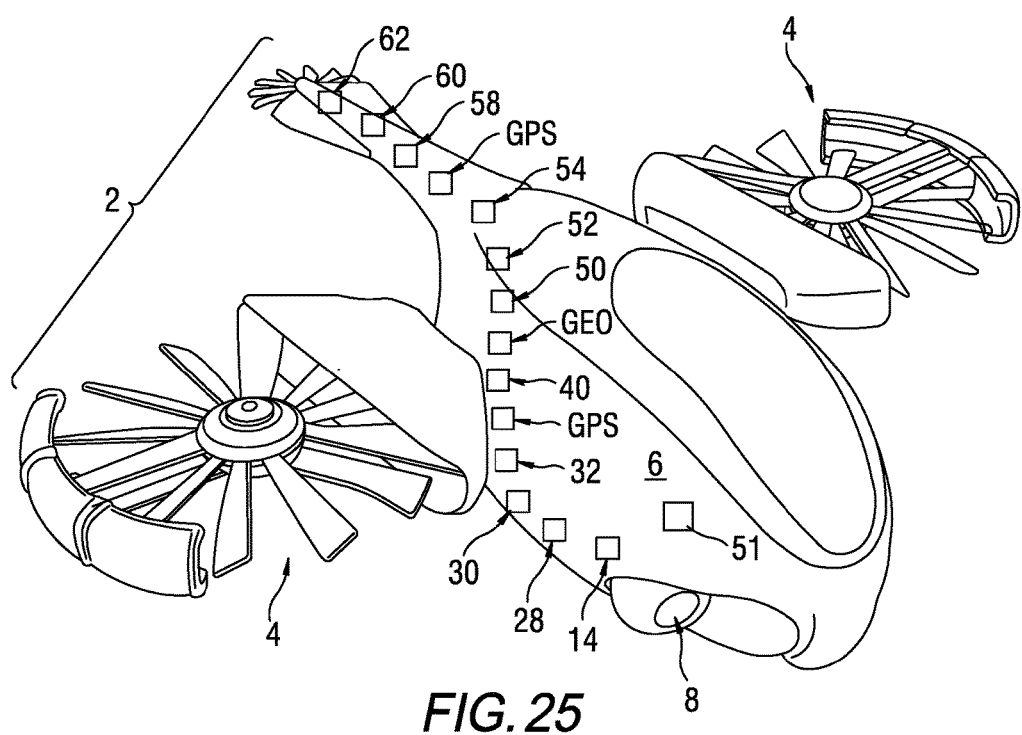
FIG. 25 illustrates equipment carried by the drone.

The drone 2 contains rechargeable storage batteries 40 in FIG. 25, which are charged by the main battery (not shown) of the vehicle 20 of FIG. 2. An electrical connector 42 in FIG. 19 connects the drone 2 to the vehicle 20 electrical system for charging. The connector 42 is of the break-away type connector in which a magnet 44 holds the two halves together. When the drone 2 exits the vehicle, as in FIG. 7, the two halves are disconnected. Such connectors 42 are used in household appliances, such as deep fryers, to prevent a pull on a power cord from toppling the appliance. In another embodiment, charging can be cord-free using conventional wireless charging.

In one form of the invention, there is no other electrical connection with the vehicle 20, such as a communication connection. In another form of the invention, there is a communication connection 48 (FIG. 19) between the vehicle 20 and the drone 2 in addition to the power connection 46. This communication connection 48 transfers signals issued by the alarm described herein or other communication devices.

The drone 2 comprises and utilizes GeoFencing in FIG. 25, known in the art, to prevent its entry into restricted airspace. The drone 2 has a WiFi or network system 51 (FIG. 25) for enabling it to connect to the Internet during flight or storage. In one embodiment, the drone 2 accesses the Internet to obtain updates to airspace restrictions.

The drone 2 also contains recording equipment 50 in FIG. 25 which records audio communications with the user 16 and relays these communications to a remote storage location, such as a cloud server accessible through the Internet. For example, if the user 16 makes a cell phone call, the drone 2 records the call.

The drone 2 is further equipped with self-leveling systems 52 in FIG. 25, known in the art, which uses accelerometers or gyroscopic sensors or both to maintain proper attitude for detection of events on the surface and for correct projection of lighting.

The drone 2 is equipped with proximity sensors 54 in FIG. 25, such as radar sensors, optical sensors, or acoustic sensors, to warn of the presence of nearby obstacles. For example, when the drone 2 is entering or exiting its storage bay or area 19, it uses these sensors 54 to detect the location of the entrance portal of the bay or area 19 and to detect the bulkheads of the bay to avoid collision with the portal or bulkheads. The sensors 54 also are used to orient the drone 2 relative to its mating electrical connector 42. The drone 2 comprises a computer 56 (FIG. 25) or microcontroller that generates the computations. For example, the computer 56 may comprise an embedded processor of the peripheral interface controller ("PIC") type, available from Microchip Technology, Chandler, Arizona. Alternately, a single-board computer 56 using a commercially available operating system can be used.

As described above, one form of the invention, the drone 2 comprises a collision avoidance system 58 that registers obstacles in the surroundings, commonly called surroundings awareness or point-to-point navigation. These systems are currently available in autonomous driving vehicles, with the possible exception that in the drone 2, a third parameter and a third controlled variable may be present, namely, altitude.

One characteristic of the autonomous drone 2 is that its movements are self-directed, as by following a computer program (contained within computer 56 in FIG. 25), although in some cases its movements can be over-ridden by external signals. The collision avoidance system 58 comprises a surroundings awareness system that uses the sensors 54 to detect objects in the immediate surroundings of the drone 2. In one embodiment, the system only registers objects exceeding a certain size. In autonomous operation, the collision avoidance system uses the collision avoidance system to detect, for example, an approaching object and if a collision is deemed imminent. If it is, then the collision avoidance system terminates movement toward the object and/or reverses direction of the drone 2. In some cases, the autonomous operation can be over-ridden. For example, if the drone 2 detects that it is approaching a fence (not shown), it may reverse direction. However, if the user 16 sees a gate or opening in the fence, the user 16 can temporarily assume command of the drone 2, guide it to the opening and then release the drone 2 to continue autonomous operation.

Point-to-point navigation can use a Global Positioning System, GPS, to travel from one point, identified by a specific (latitude, longitude, and possibly altitude) to a second point, identified by another (latitude, longitude, and possibly altitude). A control system using simple error detection can be used to fly the drone 2 in this manner. For example, when the drone 2 travels between two selected points, it can compute a straight line between them, thereby producing a collection of (X, Y) coordinate pairs running along the line. If the drone 2 is not at the proper (X, Y) position, it steers in the proper direction to achieve the (X, Y) direction and eliminate the error and continues this error-correction process. Other more sophisticated approaches are possible, such as those which reduce overshoot in reducing the error, those which maximize speed in reducing the error and so on as known in the art.

The drone 2 contains a receiver/transmitter 60 in FIG. 25 which, among other functions, receives signals which indicate the location of the user 16, who can be considered a target to be located. The signals can be of at least two types. In one type, the signals are generated by a GPS carried by the user 16 and indicate latitude, longitude and possibly altitude of the user 16. These GPS signals can be transmitted directly to the drone 2.

Alternately, these GPS signals can be transmitted indirectly to the drone 2. For example, the location of the user 16 can be deduced from the user's cell phone or from the remote activation unit 18, and this deduction would be performed by a cell phone provider or phone company. The cell phone provider relays the location signals to the drone 2. This approach may be useful if the user 16 becomes injured and cannot operate the remote activation unit 18. This approach may be a default procedure which is launched into action automatically upon summons of the drone 2. For instance, if the user 16 summons the drone 2 and then slips on ice and becomes injured, then the remote activation unit 18 automatically repeats the location of the user 16, either directly to the drone 2 or via the user's cell phone provider.

The other type of signal is not a GPS signal, but a homing signal transmitted by the user 16. The drone 2 can use these signals via a radio direction finding unit 62 in FIG. 25, which is known in the art. These signals allow direction of the user 16 from the drone 2 to be deduced.

In one form of the invention, the drone 2 may initially lie beyond the line of sight of the user 16 and so the user 16 may not be able to detect whether the drone 2 is correctly responding to the summons of the user 16. This detection can be important because if the user 16 learns that the drone 2 does not respond to the summons, the user 16 may take an alternative course of action, such as contacting an escort. To accommodate this situation, the drone 2 examines its sensors to ascertain whether its systems are functioning correctly and whether the drone 2 is in route as summoned and then transmit a confirming message so indicating to the user 16. As a specific example, the drone 2 may examine some or all of the following parameters to determine correct functioning: (1) electrical current drawn by all motors, (2) roll, pitch, and yaw of the drone 2, (3) altitude, or (4) location and speed, as determined by GPS input. The drone 2 may use one or more of these parameters or others to transmit a confirming message. As mentioned earlier, the remote activation unit 18 of the user 16 receives and displays the confirming message.

In one embodiment of the invention, the drone 2 transmits the images (still or video) taken by its video camera 14 to the user 16, as shown in FIG. 10. This transmission can assist the user 16 in assessing the significance of any threat which may be present. In another form of the invention, this transmission can be of reduced bandwidth. For example, if the drone 2 sensors 54 detect a moving object or animal, only the coordinates of those items, and not a video image, can be transmitted to the user 16, together with a description, such as a visual notification displayed on the remote activation unit 18, such as "unidentified moving object." The remote activation unit 18 of the user 16 then displays an indication of the object on a display of the remote activation unit 18, showing the relative position or distance of the object with respect to the user 16, based on the coordinates. This approach can (1) free transmission bandwidth and computer time for other purposes, (2) allow the use of less expensive equipment which has lower computing power, and/or (3) a combination of (1) and (2).

In one form of the invention, the drone 2 is an autonomous aircraft, which navigates itself toward the user 16 without control by a human. The fact that the drone 2 may receive GPS coordinates or a homing signal from a remote activation unit 18 or device in possession of the user 16 does not reduce the autonomous nature of the drone 2. The fact that the user 16 can terminate the mission of the drone 2 or assume control of the drone 2 reduce the autonomous nature of the drone 2.

One reason the drone 2 is autonomous despite these factors is that the user 16 is not actually piloting the drone 2 through the GPS or homing signals. Those signals merely state or provide a destination for the drone 2 that is used by the internal systems of the drone 2 to guide the drone 2 to that destination. By analogy, a pilot of a commercial aircraft, during a landing approach, may visually identify an intended runway through identifying a number painted on the runway. That information represents a destination, which is used by the pilot in landing the aircraft, but that information is not treated as "piloting" the aircraft.

In one form of the invention, the vehicle 20 of the user 16 is equipped with a GPS and a transmitter (not shown) which transmits the coordinates of the vehicle 20 to the drone 2. For example, the transmitter may transmit a message indicating the latitude and longitude of the vehicle 20, together with an identifier telling the drone 2 that this information location of the vehicle 20, and by inference, not the location of the user 16. This information is used by the drone 2 to guide the user 16 to the vehicle 20. It is pointed out that this identifier can be necessary because when the drone 2 receives a radio message, it does not necessarily know the origin of the message. Thus, if it receives a generalized message indicating latitude and longitude, it does not know whether the vehicle 20 or the remote activation unit 18 transmitted the message. The drone 2 identifies the source of a single one of the coordinates and by elimination, identifies the source of the other coordinates because there are only two possible sources. This identification can be done, as suggested above, by an identifier which accompanies one of the coordinates. Also, the identification can be deduced from the fact that coordinates of the vehicle 20 will not change, but those from the remote activation unit 18 probably will change. Consequently, if the drone 2 receives a series of coordinates which do not change over time, it may infer that the coordinates belong to the parked vehicle 20.

The identifier can also take the form of a specific piece of data which accompanies the coordinates. For example, as explained below, the vehicle 20 may inform the drone 2 that a burglar or danger alarm has been activated. The message which the vehicle 20 sends may always include a statement on whether the alarm has been activated, such as "no alarm" or "yes alarm." This mandatory statement tells the recipient that the vehicle 20 is the origin of the message. However, it may not be strictly necessary that the vehicle 20 or remote activation unit 18 transmit an identifier. For example, the remote activation unit 18 and the vehicle 20 can be assigned difference frequencies so that the frequency carrying a message identifies the origin.

As another example, since the parked vehicle 20 will be stationary, the vehicle 20 can transmit its coordinates when it parks, and not thereafter, so that the drone 2 is programmed or becomes aware of the location of the vehicle in advance of the issuance of a summons. In this illustration, the drone 2 never receives coordinates from the vehicle 20 thereafter, but only from the user 16.

In another example, the vehicle 20 may contain a receiver (not shown) similar to the receiver on the drone 2. When the user 16 issues a summons, the vehicle 20 also receives the summons and transmits its coordinates, perhaps several times, to reduce the possibility of error and the drone 2 confirms the coordinates. Thereafter, the vehicle 20 remains silent.

Therefore, in transmitting coordinates, a message containing the coordinates contains or implies some type of indicator which identifies the origin of message as either the vehicle 20 or the remote activation unit 18.

In one form of the invention, the vehicle 20 is equipped with the burglar or danger alarm. If the alarm is actuated, as when a window of the vehicle 20 is broken for example, the alarm notifies the user 16 by sending a signal to the remote activation unit 18 in FIG. 4. In addition, the drone 2 can detect this trip-signal and respond to this trip-signal by issuing an optical or audible redundant alarm signal to the user 16. This redundant alarm signal can be useful if the user 16 does not recognize the alarm signal, such as if the user 16 was preoccupied (e.g., texting) with something else. The redundant alarm signal from the drone 2 provides a backup to the alarm signal. The alarm signal and the redundant alarm signal operate to warn the user 16 to remain away from vehicle 20.

The preceding discussion presumed that the user 16 summoned the drone 2. In one form of the invention, the summons can be issued automatically. For example, the user 16 can program the remote activation unit 18 to issue the summons at a predetermined time. As another example, the user 16 can program the remote activation unit 18 to look for a de-activation signal from the user 16 within a certain time window, such as between noon and 2 p.m. If the remote activation unit 18 does not receive that de-activation signal, then the remote activation unit 18 summons the drone 2.

In another approach, the user 16 summons the vehicle 20 itself in which the drone 2 is stowed, instead of summoning the drone 2 alone. Self-driving autonomous vehicles have evolved sufficiently to drive safely at low speed in parking lots. Such technology can be used to guide the user's motor vehicle 20 toward the user 16. The drone 2 may exit the vehicle 20 and assume a scouting mission during this transit toward the user 16.

This operation of the vehicle 20 eliminates a need for the user 16 to walk the distance between the current position of the user 16 and the vehicle 20 in FIG. 3. In this example, the user 16 in FIG. 4 chooses at least one of the following options: (1) summoning the drone 2 by itself; (2) summoning the vehicle 20 by itself, with the drone 2 stowed inside and inactive; or (3) summoning both the drone 2 in scouting flight and the vehicle 20.

The drone 2 is equipped with the Global Positioning System, GPS, which informs the drone 2 of its current position. Consequently, when the drone 2 is parked within its bay within the vehicle 20, it knows its latitude and longitude, which it remembers, so that it can return to the vehicle 20.

In one form of the invention, the user 16 may feel threatened by a menacing person or animal, such as a dog, in which case the drone 2 can be used to protect the user. The drone 2 can use its normal search facility to locate the menacing person or animal, as by scanning for moving objects and then take appropriate action when the menacing person or animal is found.

The user 16 can assist this search. The view seen by the drone 2 is captured by camera 14 and 15 displayed on the remote activation unit 18 held by the user 16 in FIG. 10. When the display presents a dog, for example, the user can confirm the presence of the dog by sending a signal to the drone 2. The drone 2 now learns that the collection of information which it is receiving from its sensors represents a dog and not, for example, a topiary hedge cut to resemble a dog. The drone 2 responds and takes action appropriate to the presence of an actual dog.

If a specific type of object, such as a dog, is the subject of the search, it may be practical for the drone 2 to implement specific search procedures, specific equipment, or both and suppress other equipment and procedures. For example, ordinary search techniques may readily detect a barbed wire fence and then warn the user 16 to avoid the fence. Specifically, the barbed wire fence can act as a radio antenna and will respond to radio frequency (RF) energy and respond especially strongly to RF wavelengths which are certain fractions or multiples of the fence's length. However, an animal will not respond in that manner so that if the drone 2 is searching for an animal, then the drone 2 can terminate the RF-searching and instead use another technique more suitable to animal detection, such as infra-red detection, which detects heat signatures.

As another example, if a search procedure is looking for a large object, like an automobile, it may be possible to merely sample large regions of terrain or examine samples of pixels. The procedure can be enhanced by processing a larger number of pixels and not merely processing samples. Once the animal or person is detected, the drone 2 can attempt to frighten it away by using a loud audio alarm, flashing lights or the like. In one embodiment, the drone 2 can be equipped with a noxious agent (not shown) to spray upon the animal or person, such as mace, pepper spray, or tear gas. Alternately, a foul smelling chemical can be used, such a butyric acid or linoleic acid. As another approach the drone 2 can flash a strobe light or sound an audible siren or alarm toward the animal or person in an attempt to confuse the person or animal or broadcast an unusual sound or siren to frighten the person or the animal.

In addition to altering the type of searching, the drone 2 may restrict the geographic areas searched to conserve resources. For example, in searching for a moving object such as a dog, the drone 2 may ignore regions in which dogs are not likely to be present, such as ponds or rainwater retention basins. The drone 2 may detect the pond through a GPS map or by directly detecting a large, flat expanse of water. In response, the drone 2 can eliminate searching the pond and concentrate searching at other locations.

It is preferred that the drone 2 be stored within a storage bay or area 19 (FIG. 17) within the vehicle 20 so that the drone 2 is protected from the weather and also concealed. This storage bay or area 19 may comprise a chamber in a rooftop cargo rack (not shown) that allows convenient retro-fitting to existing vehicles. One benefit of a rooftop rack is that it is difficult for vandals to reach. In one form of the invention, the drone 2 is supplied with electric power from the vehicle 20 during storage. In another form of the invention, the entire rooftop rack is self-contained and self-powered. It contains its own batteries for functions, such as operating a release hatch, analogous to hatch 24 in FIG. 3, and the radio receiver for receiving a summons requesting operation of the hatch 24.

In another form of the invention, the drone 2 is not stored in the bay or storage area 19 within the vehicle 20, but instead is stored at a specific stationary storage location and is launched from that location. For example, in FIG. 2, building 22 may be the place of employment of the user 16. The drone 2 may be stored on the roof of building 22 in a protective shed along with other drones of similar type used by other people. In this example, the drone 2 may return to the rooftop storage location or leave with vehicle 20 and the user 16. As discussed above, the drone 2 may learn the coordinates of its rooftop storage location through its GPS facilities.

Figure 20A:
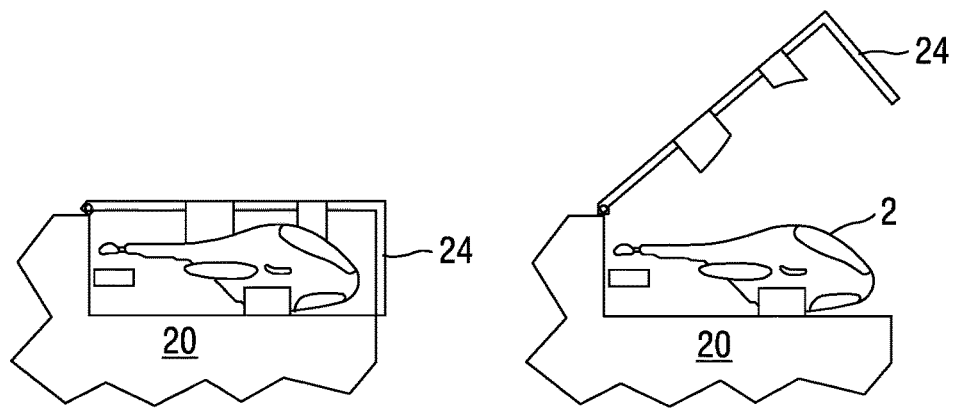

FIG. 20 illustrates the drone 2 stowed within its bay or storage area 19 in vehicle 20. Hatch 24 opens to allow the drone 2 to exit. In this example, the drone 2 uses its sensors 54 to avoid collision with the walls of the bay 19 and with the hatch 24. The drone 2 exits under its own power. In one form of the invention, upon release from the vehicle 20, the drone 2 immediately climbs to a predetermined altitude, such as 50 or 100 feet, and begins a search routine for the user 16.

In FIG. 21A, another embodiment shows the floor of the bay or storage area 19 slanted, so that the drone 2 slides out under the influence of gravity. In another form of the invention, the drone 2 is supported by a cradle 64 that may slide out of the bay when the hatch 24 is open so that it can land on the ground as in FIG. 21B, thereby allowing the drone 2 fly away as in FIG. 21C. One purpose of the cradle 64 is to provide a carrier having smooth external surfaces which will glide easily on the internal floor of the storage bay. Another purpose is to absorb the shock of landing on a hard surface, such as concrete pavement.

FIG. 22 shows the drone 2 accidentally having landed on the ground upside-down. In such a case, its rotors 4 rotate 180 degrees, as indicated, so that their thrust is directed downward and the drone 2 flies away. It later performs a loop or other suitable maneuver to attain straight-and-level flight.

Figure 23A:
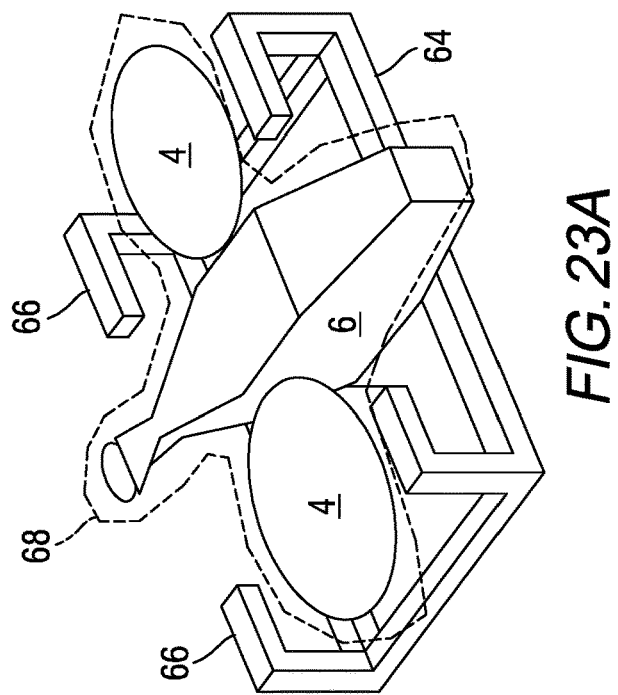
Figure 23B:
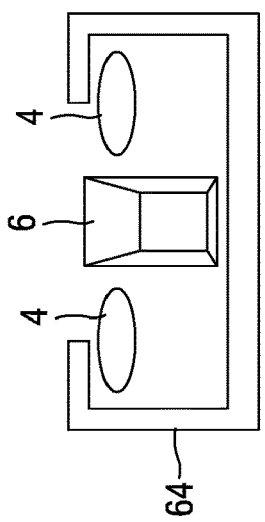

FIG. 23 illustrates another type of storage unit or cradle 64. In this embodiment, the cradle 64 has guard arms 66 to protect the hull 6 and rotors 4 during storage and during the fall to the ground shown in FIG. 21B. The guard arms 66 prevent impact between the rotors 4 and outside objects on the left and right, front and back, of the drone 2. Note that the guard arms 66 do not prevent a vertical rise of the drone 2, in flying away. From another point of view, the cradle 64 provides an aperture 68 from which the drone 2 can exit vertically, while preventing exit of the drone 2 to the left, right, forward, and backward from the cradle 64. Similarly, the guard arms 66 prevent entry of many objects into the cradle 64 in those same directions. Solid walls can extend between the guard arms 66 to prevent entry of all such objects while still maintaining the aperture 68 in place.

Figure 24:
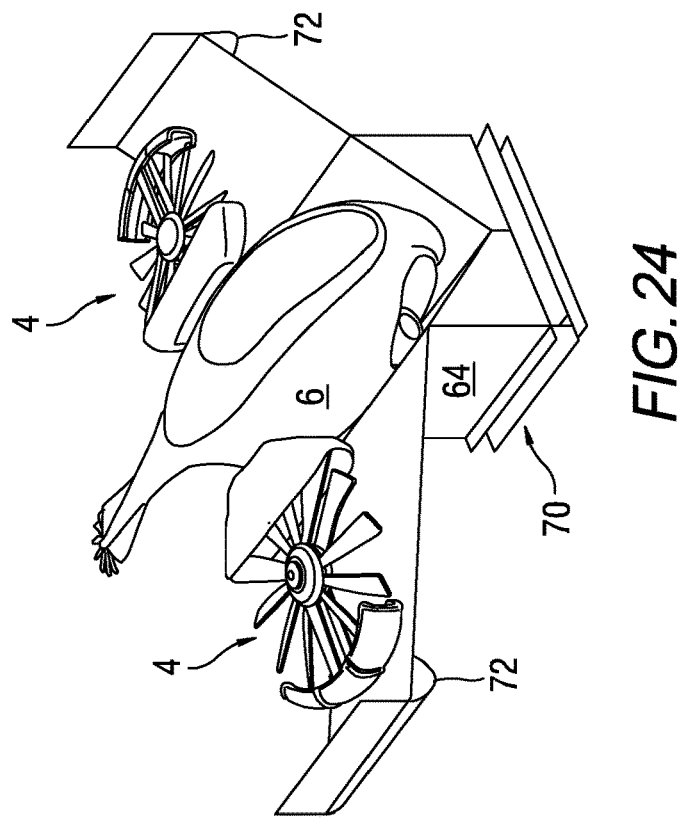
FIGS. 23 and 24 illustrate different types of cradle for supporting the drone during storage and launch.

FIG. 24 illustrates another type of cradle 64 in which the hull 6 is supported by a V-shaped support. A non-resilient bellows 70 dampens the fall of FIG. 21B and reduces or eliminates any type of bouncing which may tend to occur. The bellows 70 may take the form of a bean bag or bladder filled with a cushioning material, such as lead shot, to cause the cradle 64 to land with a dead stop in an upright position. Non-resilient cushions 72, bean bags or shot bags prevent bouncing if they strike the ground.

Thus, the system described herein provides a cradle or support means adapted and configured to generally complement the shape of the drone 2 and support it, for example, in the vehicle 20 when it is not in flight.

Additional Considerations

1. In some locations, cell phone reception is weak. To accommodate this problem, the drone 2 can be equipped with a relay device for cell signals. The GPS present in the drone 2 will allow it to climb in a helical path to an altitude of 10,000 feet, or even higher, while maintaining itself almost directly above the user 16. At altitude, the relay device can pick up cell signals which are not available at ground level and relay them to the user 16. Similarly, the relay device can pick up cell signals from the user 16 and transmit them to a cell tower. The relay device can be equipped with multiple antennas, one for receiving signals and one for transmitting cell signals remotely, and another, high-gain antenna for communication with the user 16. A gain of 5 or 10 or higher can be desirable. The high gain antenna will reduce power consumption. Land-based cell phone relays are commercially available and are sometimes called repeaters.

2. In one form of the invention, the drone 2 can be equipped with an emergency mode that the user 16 activates by issuing an emergency summons. In response, the drone 2 contacts, notifies and requests assistance from a local law enforcement, fire or rescue service. After that, the drone 2 loiters above the user 16, perhaps in widening circles alternating with narrowing circles, while flashing its lights or broadcasting a siren to gain the attention of arriving police officers or rescue personnel and lead them to the user 16.

In addition, it may be assumed that the police officers or rescue personnel will arrive in vehicles which project flashing lights of characteristic colors. The drone 2 optical sensors are adapted specifically to detect such flashing and such colors to locate the arriving police vehicles. When they are detected, the drone 2 flies to them and leads them to the user 16.

If such drones 2 become popular, police departments or other Federal, state or local agencies may decide to establish a signaling convention where their vehicles transmit an RF homing signal of specific frequency or of specific characteristics for such drones 2 to home in on so that the police or rescue can detect the drone 2 and order it to lead them to a desired location.

3. It should be appreciated that the drone system and method does not have to be used on or with a vehicle. As previously discussed, the drone could be located or stored away from the vehicle, for example in specific docking areas such as parking lots, facilities, parks, public areas or structures, buildings or the like. This would enable the user to summon the drone system from a network of public or private docking areas to escort or direct the summoner to and from specified or default locations. One illustrative example is that the drone system and method could be used as an autonomous search and rescue device where a lost or compromised summoner could summon the apparatus using a unique device (i.e., a key-FOB or device they rent or lease from local facilities) or a standard device (i.e., a smart phone). The apparatus would then navigate to find them and then escort them to a specific location and broadcast their situation (via video, audio and location) to search and rescue facilities.

This invention, including all embodiments shown and described herein, could be used alone or together and/or in combination with one or more of the features covered by one or more of the claims set forth herein, including but not limited to one or more of the features or steps mentioned in the Summary of the Invention and the claims.

While the system, apparatus and method herein described constitute preferred embodiments of this invention, it is to be understood that the invention is not limited to this precise system, apparatus and method, and that changes may be made therein without departing from the scope of the invention which is defined in the appended claims.

What is claimed is:

1. A drone for assisting a driver who is located remote from a vehicle, the drone comprising:
   a primary light source; and processing circuitry configured to
   fly the drone towards the driver in response to a summons issued by a communication system;
   fly the drone towards the vehicle using a path identified to avoid an obstacle;
   illuminate the path using the primary light source of the drone; and project light from the primary light source of the drone to act as reverse lighting when a reverse gear of the vehicle is activated.

2. The drone according to claim 1, further comprising:
i) a navigation system which (A) deduces current latitude and longitude of said drone, (B) receives a destination, indicated by a latitude and a longitude, from said communication device, and (C) pilots said drone toward said destination;
ii) one or more movable spotlights which can illuminate terrestrial regions;
iii) at least one of a still camera or a video camera which can capture images of terrestrial regions;
iv) a transmitter for transmitting said images to a remote storage location; and
v) a detector for detecting moving terrestrial entities.

3. The drone according to claim 1, further comprising a camera, the primary light source being adapted to provide a spotlight that provides illumination which assists said camera in capturing images.

4. The drone according to claim 1, in which said primary light source comprises a first spotlight that illuminates a first area and a second spotlight that illuminates a second area.

5. The drone according to claim 4, wherein the processing circuitry is further configured to detect a moving object or person and said second spot is directed at or near said object or person.

6. The drone according to claim 1, in which, prior to receipt of said summons, said drone is stowed in said vehicle.

7. The drone according to claim 1, wherein prior to receipt of said summons, said drone is located on or in a stationary building or structure outside said vehicle.

8. The drone according to claim 1, wherein said vehicle transmits its coordinates to the drone; and the drone guides said driver toward said vehicle based on said coordinates.

9. The drone according to claim 1, wherein the drone flies toward said driver and guides said driver toward said vehicle by energizing the primary light source lighting the path for said driver.

10. The drone according to claim 1, wherein the communication device transmits at least one of a set of coordinates of said driver or a deployment signal to the drone.

11. The drone according to claim 1, wherein said communication device is at least one of a smart phone application, a Personal Digital Assistant (PDA), a key fob or a standard joystick-type remote control.

12. The drone according to claim 1, further comprising:
i) a navigation system which (A) deduces current latitude and longitude of said drone, (B) receives a destination, indicated by a latitude and a longitude, from said communication device, and (C) pilots said drone toward said destination;
ii) one or more movable spotlights which can illuminate terrestrial regions;
iii) at least one of a still camera or a video camera which can capture images of terrestrial regions; and
iv) a break-away type connector to couple to an electrical system of the vehicle for charging.

13. A system for assisting a driver of a motor vehicle, comprising:
an aircraft or drone comprising:
a propulsion system for maintaining said aircraft or drone airborne;
a receiver for receiving at least one location signal indicating a location of a driver;
at least one light source;
a control system for directing said at least one light source toward either said driver or a vicinity of said driver; wherein the control system projects light from the primary light source of the drone to act as reverse lighting when a reverse gear of the vehicle is activated,
a navigation system which enables said aircraft or drone to fly autonomously from a storage location toward the driver in response to a summons from a transmitter under control of said driver and
a storage container configured to be detachably mounted on the vehicle.

14. The system according to claim 13, wherein at least one signal comprises a drone release or deployment signal and a driver location or coordinate signal.

15. The system according to claim 13, in which said vehicle comprises a storage area or bay for storing said aircraft or drone, said storage area or bay releases said aircraft or drone in response to a release or deployment signal from said transmitter.

16. The system according to claim 13, wherein said transmitter is at least one of a smart phone application, a Personal Digital Assistant (PDA), a key fob or a standard joystick-type remote control.

17. The system according to claim 13, wherein said at least one light source lights a pathway to the vehicle for the driver.

18. A method for assisting a user who is located remote from a vehicle, the method comprising:
receiving, using processing circuitry of a drone, an input from the user indicating that the drone is summoned;
determining, using the processing circuitry, a path to the vehicle to be taken by the user, the path being identified to avoid a detected object;
fly the drone towards the user;
illuminating the path using a primary light source of the drone;
fly towards the vehicle using the path; and
projecting light from the primary light source of the drone to act as reverse lighting in response to detecting that a reverse gear of the vehicle is activated.

19. The method of claim 18, further comprising:
determining whether the drone is in route as summoned;
determining whether systems of the drone are functioning correctly; and
transmitting a confirming message to the user indicating that the drone is in route as summoned.

20. The system of claim 13, wherein the storage container includes a cradle having a plurality of guard arms.

* * * * *